Figure 1:
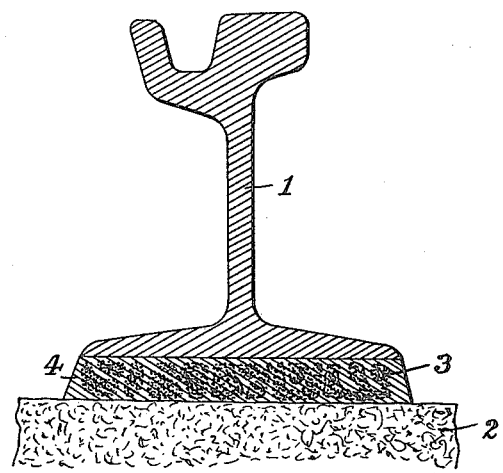

J. ROBBINS.
MEANS FOR SUPPORTING RAILS SUCH AS THOSE OF TRAMWAYS.
APPLICATION FILED SEPT. 19, 1914.

1,128,048.

Patented Feb. 9, 1915.

WITNESSES

INVENTOR
JAMES ROBBINS
BY
ATTORNEYS

UNITED STATES PATENT OFFICE.

JAMES ROBBINS, OF WESTMINSTER, LONDON, ENGLAND.

MEANS FOR SUPPORTING RAILS, SUCH AS THOSE OF TRAMWAYS.

1,128,048. Specification of Letters Patent. Patented Feb. 9, 1915.

Application filed September 19, 1914. Serial No. 862,572.

*To all whom it may concern:*

Be it known that I, JAMES ROBBINS, a subject of the King of Great Britain, residing at 11 Tothill street, in the city of Westminster and county of London, England, have invented new and useful Improvements in Means for Supporting Rails, Such as Those of Tramways, of which the following is a specification.

Lines of rails, such as those of tramways, which are supported upon foundations of the ordinary character, have to be frequently disturbed in order that the foundations may be renewed, or repaired, as they rapidly become deteriorated owing to the said foundations being injuriously affected by the vibrations imparted by traffic to the rails and by the admission, or penetration, of moisture.

According to my invention the ordinary foundations are supplemented, by the insertion, between the bottom flange, or foot, of each rail and the concrete, or other supporting bed, of a combination (hereinafter called the seating) of ropes, or the like, of fibrous material with plastic cement, or like material, which is water-resistant and will not become hard and friable; for example, the cement known as Robbins's non-set plastic cement, the ropes, or the like, being preferably tarred, or otherwise treated with a suitable preservative material, and they may be arranged side by side, along, or interwoven with, lengths of a supporting material of a width about equal to the width of the required seating, but the use of this supporting material is not essential. When this supporting material is used, it may, for example, be perforated metal, or wire-gauze, or it may be a woven, or otherwise formed, fabric of fibrous material tarred, or otherwise treated with a preservative, (such, for example, as the material known as bratticecloth,) and the tarred ropes, or the like, can, if desired, be attached to the said supporting material by cement, by sewing, or by staples, or by interweaving, or by interlacing the ropes, or the like, with the said supporting material, or in any other suitable manner lengthwise, or crosswise, of the supporting material, or in any other suitable position relatively thereto, or the said ropes, or the like, may be interwoven, or intertwisted, with each other and used either with, or without, the aforesaid supporting material. The plastic cement, or like material, can be applied so that it fills any spaces there may be between the said tarred ropes, or the like, and it may also be applied to the supporting material and, if desired, there may be a layer of material, (for example similar to that constituting the supporting material,) above, as well as below, the said tarred ropes or the like, and the plastic cement, or like material, may be applied below, or above, or both below and above, such layers of material. If desired the several constituents of the said seating, or some of the said constituents, may be put together before they are put in place as a seating for the rails, or they may be applied separately, or in part, separately, for example, some plastic cement, or like material, can be first put in place then the supporting material, with the tarred ropes, or the like, attached thereto, be applied, or such supporting material and the tarred ropes, or the like, may be applied separately, then more plastic cement, or like material, be applied and then, if desired, a further layer (like that, for example, which constitutes the supporting material) be put in place, with, or without, more plastic cement, or like material, applied above it. The foregoing presumes that the aforesaid materials are applied as a seating before the rails are put in place.

Figure 2:
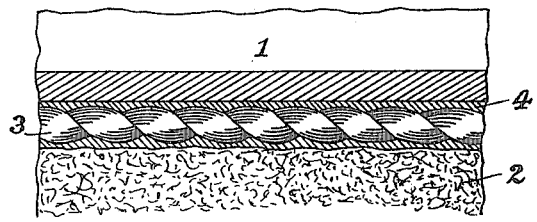

In the accompanying drawing, Figure 1 is a cross section; and Fig. 2 is a longitudinal section through a rail seating in which my invention is illustratively embodied.

Presuming that the seating is to be applied after the rails are in place, the following (explained with regard to the accompanying cross and longitudinal sections) may be the procedure:—The rails (1) may be supported upon the supporting bed (2) by the intervention of wedges before the seating, according to my invention, is put in place. Tarred jute ropes (3) are driven in from each side between the flanges of the rails (1) and the supporting bed (2) the plastic cement (4) being introduced between the ropes (3) and filled in to cover, or "point," those ropes (3) which have been last introduced, the said ropes (3) and cement (4) being driven in by any suitable means; such, for example, as calking tools, blunt nosed picks, pneumatic hammers, or the like. If desired an abutment can be formed at one edge of the flanges of the rails and all the materials be driven in from beneath the edges at the other side.

I do not limit myself to the precise ways hereinbefore described of combining the ropes, or the like, and the plastic material and putting them in place as they may be combined and put in place in any other way which will give the desired effects of sufficient resistance to injury by vibrations and other causes of injury and enable the plastic cement, or like material, and the ropes, or the like, to remain in place with the plastic cement, or like material, therein, and this plastic cement, or like material, may be of any suitable kind such as the aforesaid non-set plastic cement, or any other material which is water-resistant and will not become hard and friable.

I am aware that it has been proposed heretofore to mix fibrous material with cement to form a rail seating and I do not claim to be the inventor of such subject matter. So far as I am aware, however, it has not heretofore been proposed to support the rail upon strands of rope, more particularly upon strands of tarred rope laid lengthwise beneath the rail, which strands take the load and directly transmit it to the underlying support, in conjunction with a plastic cement packed between and around the rope strands to protect the same against moisture or the like.

What I claim is:—

1. A seating for rails, comprising strands of fibrous rope on which the rail or the like is seated and through which the load is transmitted to an underlying support, in combination with a filling of plastic waterproofing cement forming a packing between and around said rope strands and serving to protect the latter from moisture or other injurious matter.

2. A seating for rails, comprising strands of fibrous rope arranged side by side and extending lengthwise beneath the rail or the like and on which the latter is seated and through which the load is transmitted to an underlying support, in combination with a filling of plastic water-proofing cement forming a packing between and around said rope strands and serving to protect the latter from moisture or other injurious matter.

3. A seating for rails, comprising strands of tarred rope on which the rail or the like is seated and through which the load is transmitted to an underlying support, in combination with a filling of plastic waterproofing cement forming a packing between and around said rope strands and serving to protect the latter from moisture or other injurious matter.

In testimony whereof I have signed my name to this specification in the presence of two subscribing witnesses.

JAMES ROBBINS.

Witnesses:
GILBERT FLETCHER TYSON,
VINCENT GIARDELLI.

Copies of this patent may be obtained for five cents each, by addressing the "Commissioner of Patents, Washington, D. C."